(12) United States Patent
Chu et al.

(10) Patent No.: US 9,385,927 B2
(45) Date of Patent: Jul. 5, 2016

(54) METHOD FOR MANAGING TRANSMISSION ORDER IN NETWORK

(71) Applicant: WISTRON CORP., New Taipei (TW)

(72) Inventors: Huai-Hsuan Chu, New Taipei (TW); Chih-Ming Chen, New Taipei (TW)

(73) Assignee: Wistron Corp., New Taipei (TW)

( * ) Notice: Subject to any disclaimer, the term of this patent is extended or adjusted under 35 U.S.C. 154(b) by 318 days.

(21) Appl. No.: 14/067,877

(22) Filed: Oct. 30, 2013

(65) Prior Publication Data

US 2014/0173100 A1 Jun. 19, 2014

(30) Foreign Application Priority Data

Dec. 18, 2012 (TW) .............................. 101147998 A

(51) Int. Cl.
*G06F 15/16* (2006.01)
*H04L 12/24* (2006.01)

(52) U.S. Cl.
CPC ........ *H04L 41/5077* (2013.01); *H04L 41/5022* (2013.01)

(58) Field of Classification Search
CPC ....... H04L 1/00; H04L 47/10; H04L 12/5695; H04L 47/12; H04L 47/808; H04L 65/104; H04L 65/1069; H04L 65/80; H04L 41/5022; H04L 41/5077
See application file for complete search history.

(56) References Cited

U.S. PATENT DOCUMENTS

| | | | | |
|---|---|---|---|---|
| 6,205,150 B1 * | 3/2001 | Ruszczyk | ............. | H04L 47/564 370/412 |
| 7,130,912 B2 * | 10/2006 | Nishikado | ............... | H04L 67/42 709/225 |
| 7,421,273 B2 * | 9/2008 | Diepstraten | ......... | H04L 12/5693 370/348 |
| 7,782,855 B2 * | 8/2010 | Denney | ............... | H04L 12/2801 370/392 |
| 8,238,346 B2 * | 8/2012 | Howe | ................ | H04W 72/1242 370/395.42 |
| 2006/0121946 A1 * | 6/2006 | Walton | ................. | H04B 7/0417 455/561 |
| 2009/0067328 A1 * | 3/2009 | Morris | ............. | H04W 72/1242 370/230.1 |
| 2010/0027467 A1 * | 2/2010 | Wu | ....................... | H04W 48/18 370/328 |
| 2012/0233287 A1 * | 9/2012 | Queru | .................... | H04L 67/06 709/217 |

FOREIGN PATENT DOCUMENTS

| | | |
|---|---|---|
| TW | 200302642 A | 8/2003 |
| TW | 200840283 A | 10/2008 |
| TW | 201008350 A1 | 2/2010 |

OTHER PUBLICATIONS

Ethernet—Wikipedia, the free encyclopedia, http://en.wikipedia.org/wiki/Ethernet.*

(Continued)

*Primary Examiner* — Moustafa M Meky
*Assistant Examiner* — Thorne E Waugh

(57) ABSTRACT

A method for managing a transmission order in a network includes the steps of: providing an upstream host and a plurality of downstream hosts; performing a order of a plurality of data transmission events between the upstream host and the plurality of the downstream hosts; performing a first data transmission event by the upstream host to receive first data from a first downstream host; monitoring whether the upstream host receives any priority instructions from any other downstream hosts; and if a first priority instruction is received from a second downstream host during the first data transmission event, stopping the first data transmission event and performing a second data transmission event by the upstream host to receive second data from the second downstream host.

16 Claims, 4 Drawing Sheets

(56) References Cited

OTHER PUBLICATIONS

Fixed-priority pre-emptive scheduling—Wikipedia, the free encyclopedia, http://en.wikipedia.org/wiki/Fixed-priority_pre-emptive_scheduling.*

Open Flow—Wikipedia, the free encyclopedia, http://en.wikipedia.org/wiki/OpenFlow.*
Virtual machine—Wikipedia, the free encyclopedia, http://en.wikipedia.org/wiki/Virtual_machine.*
Taiwan Patetn Office, Office Action, Patent Application Serial No. 101147998, Nov. 24, 2014, Taiwan.

* cited by examiner

METHOD FOR MANAGING TRANSMISSION ORDER IN NETWORK

CROSS REFERENCE TO RELATED APPLICATIONS

This Application claims priority of Taiwan Patent Application No. 101147998 filed on Dec. 18, 2012, the entirety of which is incorporated by reference herein.

BACKGROUND OF THE INVENTION

1. Field of the Invention

The present invention generally relates to a method for managing a transmission order. In particularly relates to a method for managing a transmission order in a network, and a non-transitory computer-readable medium storing a computer program product operable to perform the method.

2. Description of the Related Art

Traditionally, transmission of packages in a network is performed according to FIFO (First In First Out) method of the Ethernet. That is, a package which is input first can be transmitted first. However, if another package after a preceding package is urgent, it will not be transmitted until the transmission of all prior packages is finished. Traditional methods for data transmission have disadvantages such as: lacking efficiency; and less timely.

BRIEF SUMMARY OF THE INVENTION

In one embodiment, the disclosure is directed to a method for managing a transmission order in a network, comprising the steps of: providing an upstream host and a plurality of downstream hosts; performing an order of a plurality of data transmission events between the upstream host and the plurality of the downstream hosts; performing a data transmission event by the upstream host to receive first data from a first downstream host; monitoring whether the upstream host receives any priority instructions from any other downstream hosts; and if a first priority instruction is received from a second downstream host during the first data transmission event, stopping the first data transmission event and performing a second data transmission event by the upstream host to receive second data from the second downstream host.

In another exemplary embodiment, the disclosure is directed to a non-transitory computer-readable medium storing a computer program product operable to perform operations comprising: performing an order of a plurality of data transmission events between a upstream host and a plurality of the downstream hosts; performing a first data transmission event to receive first data from a first downstream host; monitoring whether the upstream host receives any priority instructions from any other downstream hosts; and if a first priority instruction is received from a second downstream host during the first data transmission event, stopping the first data transmission event and performing a second data transmission event to receive second data from the second downstream host.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

In order to illustrate the purposes, features and advantages of the invention, the embodiments and figures thereof in the invention are described in detail as follows.

Figure 1:
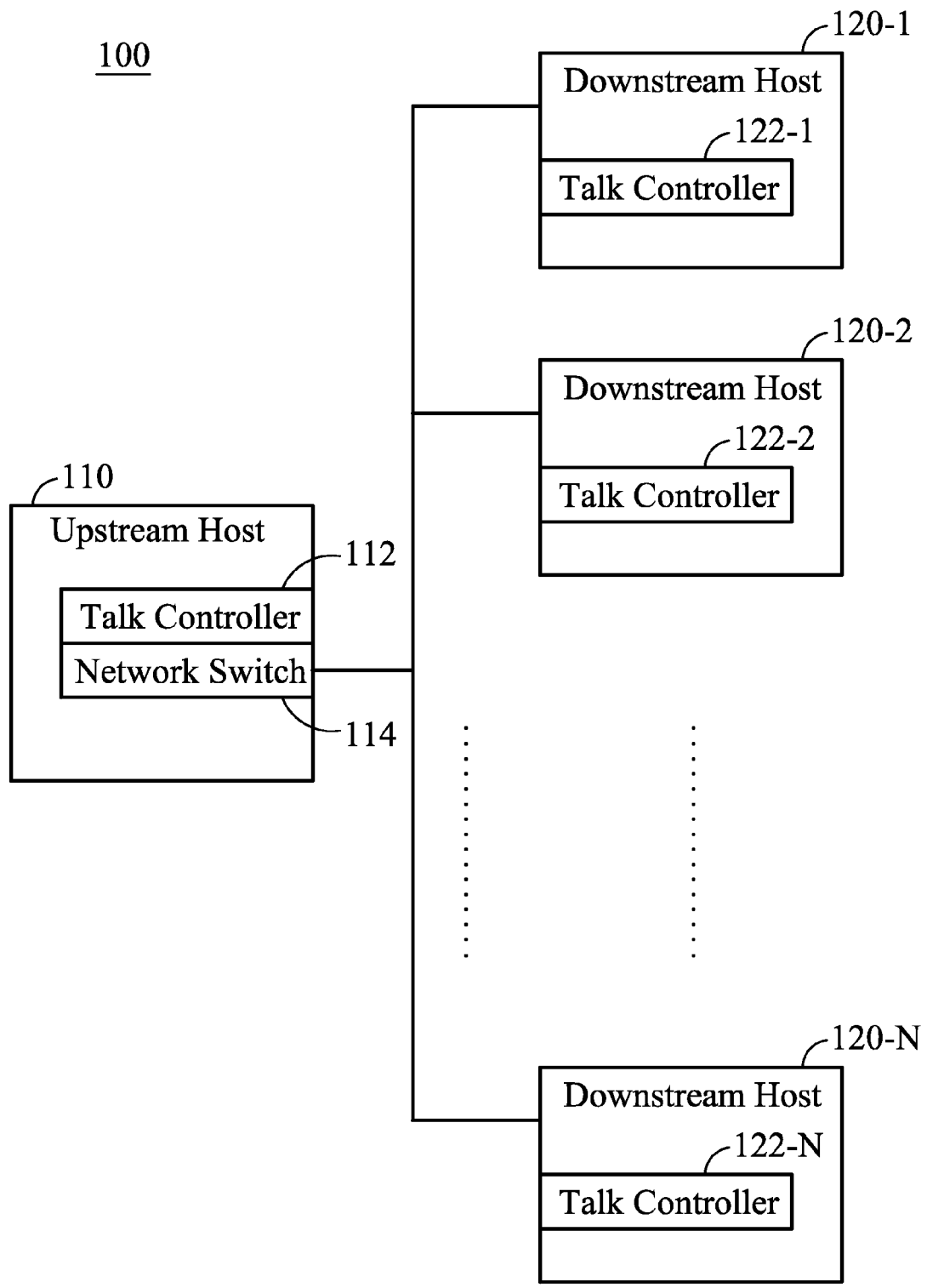
FIG. 1 is a diagram for illustrating a network system according to an embodiment of the invention.

FIG. 1 is a diagram for illustrating a network system 100 according to an embodiment of the invention. The network system 100 may be implemented in a cloud device or in a data center of the cloud device. As shown in FIG. 1, the network system 100 at least comprises an upstream host 110 and a plurality of downstream hosts 120-1, 120-2, . . . , and 120-N (N is a positive integer greater than 2). More particularly, the upstream host 110 comprises a talk controller 112 and a network switch 114, and the downstream hosts 120-1, 120-2, . . . , and 120-N comprise a plurality of talk controllers 122-1, 122-2, . . . , and 122-N. The upstream host 110 and the downstream hosts 120-1, 120-2, . . . , and 120-N are a plurality of network nodes of the network system 100. The upstream host 110 is configured to receive a plurality of data from the downstream hosts 120-1, 120-2, . . . , and 120-N. The talk controller 112 of the upstream host 110 can communicate with the talk controllers 122-1, 122-2, . . . , and 122-N of the downstream hosts 120-1, 120-2, . . . , and 120-N so as to control the reception order and the reception time lengths thereof. Accordingly, some urgent data transmission events can be performed first. Note that the network system 100 may further comprise more network nodes and each of the downstream hosts 120-1, 120-2, . . . , and 120-N may further comprise a network switch (not shown). In some embodiments, when the upstream host 110 transmits data to a front host (not shown), the upstream host 110 may be considered as a downstream host, and when any of the downstream hosts 120-1, 120-2, . . . , and 120-N receives data from a rear host (not shown), the downstream host may be considered as an upstream host.

In some embodiments, the upstream host 110 and the downstream hosts 120-1, . . . , and 120-N are physical machines (PMs). The upstream host 110 may be coupled through an Ethernet to the downstream hosts 120-1, 120-2, . . . , and 120-N. In other embodiments, the upstream host 110 and the downstream hosts 120-1, 120-2, . . . , and 120-N are virtual machines (VMs), and are implemented with a computer software product.

In some embodiments, the upstream host 110 and the downstream hosts 120-1, 120-2, . . . , and 120-N use an Openflow network structure. The Openflow network structure is a novel structure for achieving SDN (Software Defined Networking). In comparison to a conventional method of indicating and exchanging network packages through a network router and a network switch, the Openflow network structure controls network paths and package transmission via software. The Openflow network structure can define network service fast according to requirements of an administrator to increase the efficiency of the network processing procedure. Specifically, the Openflow network structure separates network paths and package transmission from the conventional network router and network switch. Thus, the network paths are controlled by a controller with the Openflow control software, and the package transmission is control by an Openflow network switch.

Figure 2:
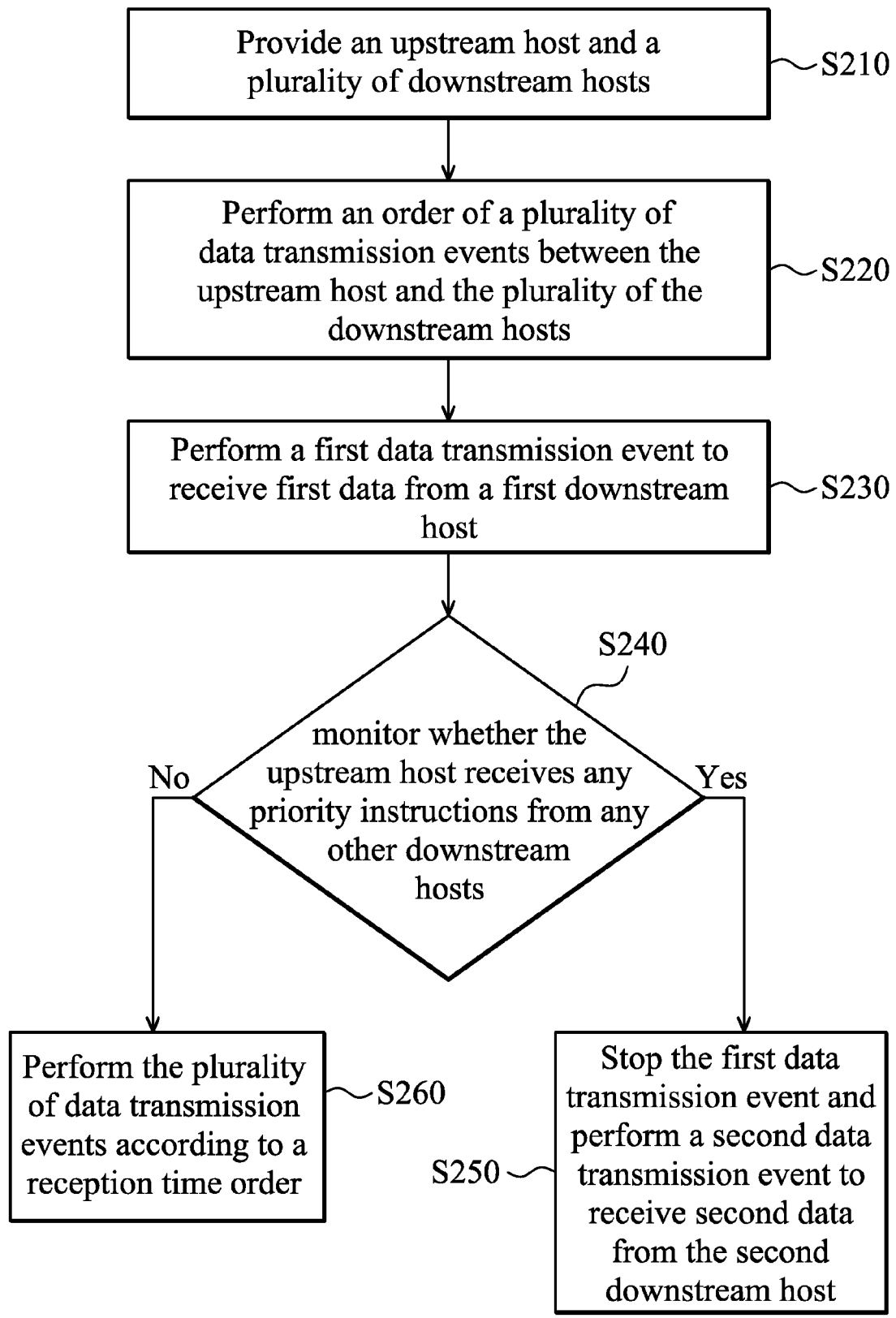
FIG. 2 is a flowchart for illustrating a method for managing a transmission order in a network according to an embodiment of the invention.

FIG. 2 is a flowchart for illustrating a method for managing a transmission order in a network according to an embodiment of the invention. Refer to FIG. 1 and FIG. 2 together. To begin, in step S210, an upstream host and a plurality of downstream hosts are provided. In step S220, a order of a plurality of data transmission events between the upstream host and the plurality of the downstream hosts is managed. In some embodiments, the upstream host may further control transmission time lengths of the plurality of data transmission lengths. In step S230, a first data transmission event is performed by the upstream host to receive first data from a first downstream host (e.g., the downstream host 120-1). In step S240, whether the upstream host receives any priority instructions from any other downstream hosts (e.g., the downstream hosts 120-2, . . . , and 120-N) is continuously monitored. In step S250, if a first priority instruction is received from a second downstream host (e.g., the downstream host 120-2) during the first data transmission event, the first data transmission event is stopped and a second data transmission event is performed by the upstream host to receive second data from the second downstream host. That is, a priority order of the second data transmission event is higher than that of the first data transmission event. In some embodiments, a talk controller of the upstream host stops the first data transmission event by transmitting a stop-talk command via a network switch to a talk controller of the first downstream host, and starts the second data transmission event by transmitting a start-talk command via the network switch to a talk controller of the second downstream host. In step S260, if no priority instruction is received, the plurality of data transmission events are performed by the upstream host according to a reception time order.

In some embodiments, the method further comprises the following steps. If a third downstream host (e.g., the downstream host 120-N) has waited to transmit third data for a predetermined period of time (e.g., 10 seconds), a second priority instruction is transmitted by the third downstream host to the upstream host. If the second priority instruction is received from the third downstream host during the first data transmission event, the first data transmission event is stopped and a third data transmission event is performed by the upstream host to receive the third data from the third downstream host. Note that the all steps of the method mentioned above may be not performed in order, and may be performed repeatedly.

Figure 3:
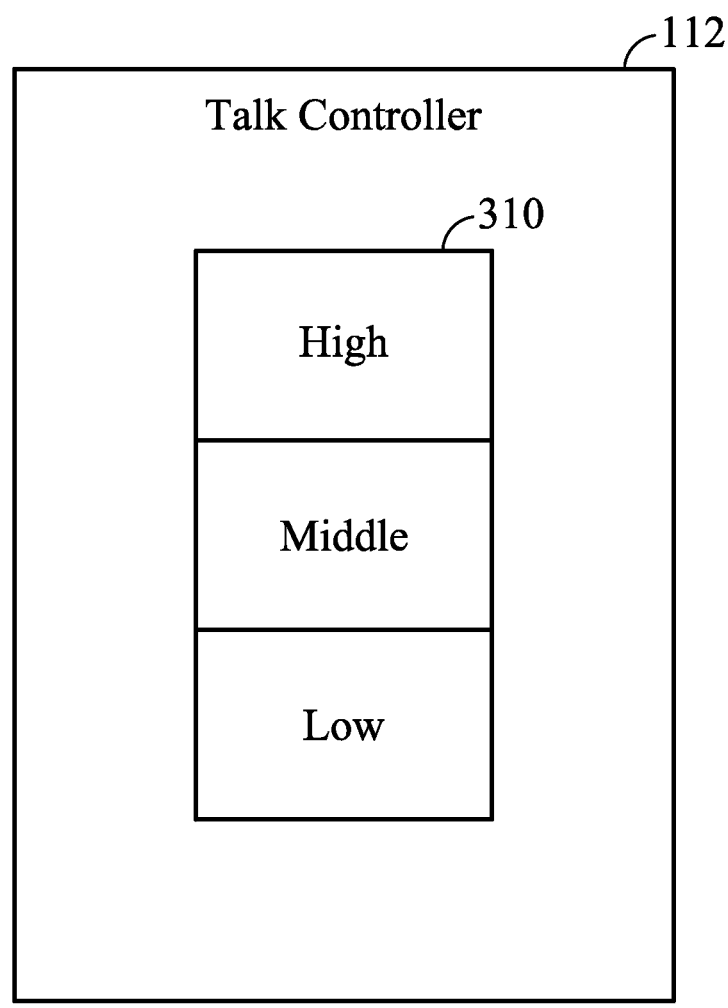
FIG. 3 is a diagram for illustrating a talk controller of a upstream host according to an embodiment of the invention.

FIG. 3 is a diagram for illustrating the talk controller 112 of the upstream host 110 according to an embodiment of the invention. As shown in FIG. 3, the talk controller 112 of the upstream host 110 stores an arbitration table 310. The arbitration table 310 is arranged for classifying the priority orders of the plurality of data transmission events. In some embodiments, the plurality of data transmission events are classified into high priority middle priority events, and low priority events. The upstream host 110 manages the order of the plurality of data transmission events according to the arbitration table 310. For example, the upstream host 110 is going to perform a first data transmission event, a second data transmission event, and a third data transmission event from the downstream hosts 120-1, 120-2, . . . , and 120-N. If the first data transmission event, the second data transmission event, and the third data transmission event are all classified as low priority events in the arbitration table 310, the upstream host 110 will perform the data transmission events according to the reception time order thereof. If the second data transmission event is classified as the high priority event, but the first data transmission event and the third data transmission event are both classified as the low priority events in the arbitration table 310, the upstream host 110 will perform the second data transmission event first. The method can avoid delay in receiving some important data. In addition, if the third data transmission, which is originally classified as the middle priority event, has been waiting to be performed for a predetermined period of time (e.g., 10 seconds), the third data transmission event will be promoted to the high priority event in the arbitration table 310. In some embodiments, the priority order of each of the plurality of data transmission events in the arbitration table 310 gradually increases as a waiting time period thereof increases, thereby a long delay is prevented.

In some embodiments, the talk controllers 122-1, 122-2, . . . , and 122-N of the downstream hosts 120-1, 120-2, . . . , and 120-N are configured to monitor a plurality of input packages entering the downstream hosts 120-1, 120-2, . . . , and 120-N to determine whether to transmit any priority instructions to the upstream host 110. For example, when the downstream host 120-2 receives an urgent input package, the talk controller 122-2 of the downstream host 120-2 immediately transmits a priority instruction to the upstream host 110 such that the upstream host 110 stops a current data transmission event to receive urgent data from the downstream host 120-2.

Figure 4:
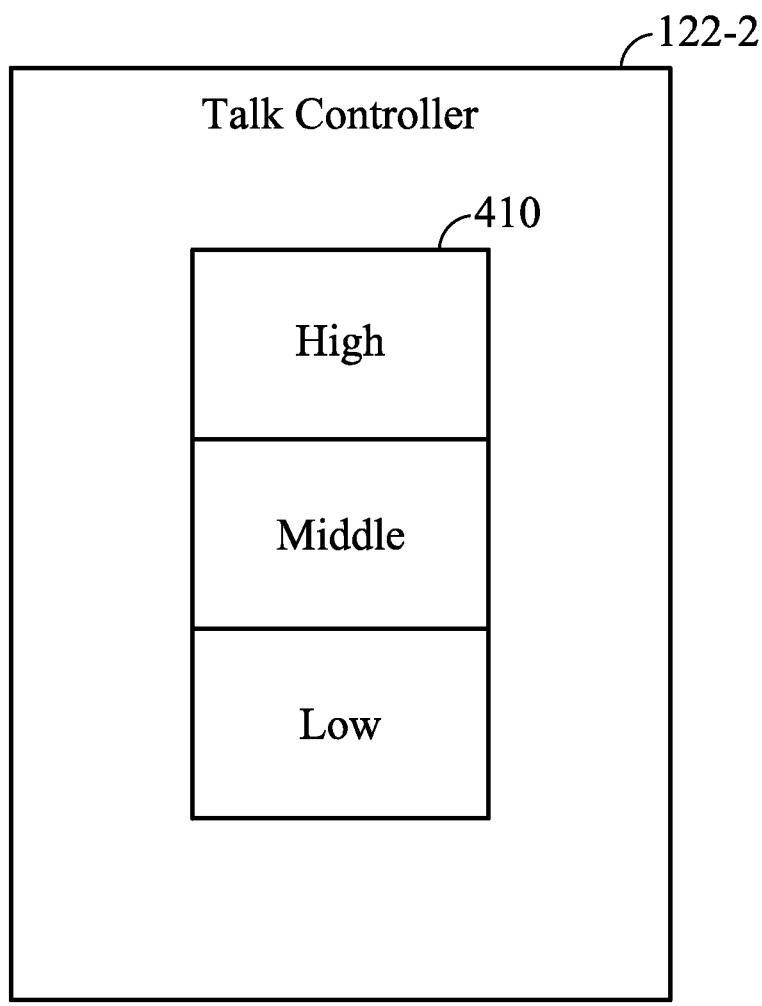
FIG. 4 is a diagram for illustrating a talk controller of a downstream host to an embodiment of the invention.

FIG. 4 is a diagram for illustrating the talk controller 122-2 of the downstream host 120-2 according to an embodiment of the invention. As shown in FIG. 4, the talk controller 122-2 stores a transmission table 410 for classifying priority orders of a plurality of input packages entering the downstream host 120-2. In some embodiments, the plurality of input packages are classified into high priority input packages, middle priority input packages, and low priority input packages. The downstream host 120-2 determines whether to transmit any priority instructions to the upstream host 110 according to the transmission table 410. For example, there are a first input package, a second input package, and a third input package that are entering the downstream host 120-2. If the first input package, the second input package, and the third input package are all classified as low priority input packages in the transmission table 410, the downstream host 120-2 will not transmit any priority instructions. If any of the first input package, the second input package, and the third input package is classified as the high priority input package in the transmission table 410, the downstream host 120-2 will transmit a priority instruction to the upstream host 110, and the upstream host 110 will stop a current data transmission event to receive urgent data from the downstream host 120-2. Note that each of the talk controllers 122-1, 122-2, . . . , and 122-N of the downstream hosts 120-1, 120-2, . . . , and 120-N may store a transmission table. The downstream hosts 120-1, 120-2, . . . , and 120-N may also be operated as the above method although they are not all displayed in FIG. 4.

In some embodiments, the upstream host 110 may further store a transmission table, and each of the downstream hosts 120-1, 120-2, . . . , and 120-N may further store an arbitration table. The operations of may be similar to those described in the embodiments of FIG. 3 and FIG. 4.

In the invention, the method for managing a transmission order in a network process, with urgent data first, is not limited to the FIFO network transmission in prior art. In addition, the method of the invention can manage priority settings and transmission time lengths thereof to increase the efficiency of data transmission.

The method of the invention, or certain aspects or portions thereof, may take the form of a program code (i.e., executable instructions) embodied in tangible media, such as floppy diskettes, CD-ROMS, hard drives, or any other machine-readable storage medium, wherein, when the program code is loaded into and executed by a machine, such as a computer, the machine thereby becomes an apparatus for practicing the methods. The methods may also be embodied in the form of a program code transmitted over some transmission medium, such as electrical wiring or cabling, through fiber optics, or via any other form of transmission, wherein, when the program code is received and loaded into and executed by a machine, such as a computer, the machine becomes an apparatus for practicing the disclosed methods. When implemented on a general-purpose processor, the program code combines with the processor to provide a unique apparatus that operates analogously to application specific logic circuits.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

It will be apparent to those skilled in the art that various modifications and variations can be made in the invention. It is intended that the standard and examples be considered as exemplary only, with a true scope of the disclosed embodiments being indicated by the following claims and their equivalents.

What is claimed is:

1. A method for managing a transmission order in a network comprising an upstream host and a plurality of downstream hosts, the method comprising:
    managing, by the upstream host, an execution order of a plurality of data transmission events between the upstream host and the plurality of the downstream hosts;
    performing, by the upstream host, a first data transmission event in the execution order to receive first data from a first downstream host;
    monitoring, by the upstream host, whether the upstream host receives any priority instructions from any other downstream hosts; and
    if a first priority instruction is received from a second downstream host during the first data transmission event, stopping the first data transmission event and performing a second data transmission event by the upstream host to receive second data from the second downstream host;
    wherein each of the upstream host and the plurality of downstream hosts comprises a talk controller, and the upstream host further comprises a network switch;
    wherein the talk controller of the upstream host stops the first data transmission event by transmitting a stop-talk command via the network switch to the talk controller of the first downstream host, and starts the second data transmission event by transmitting a start-talk command via the network switch to the talk controller of the second downstream host.

2. The method as claimed in claim 1, further comprising:
    if no priority instruction is received, performing the plurality of data transmission events by the upstream host according to the execution order, wherein the execution order is a reception time order.

3. The method as claimed in claim 1, wherein a priority order of the second data transmission event is higher than that of the first data transmission event.

4. The method as claimed in claim 1, further comprising:
    controlling transmission time lengths of the plurality of data transmission events by the upstream host.

5. The method as claimed in claim 1, further comprising:
    if a third downstream host has waited to transmit a third data for a predetermined period of time, transmitting a second priority instruction by the third downstream host to the upstream host; and
    if the second priority instruction is received from the third downstream host during the first data transmission event, stopping the first data transmission event and performing a third data transmission event by the upstream host to receive the third data from the third downstream host.

6. The method as claimed in claim 1, wherein the talk controller of the upstream host stores an arbitration table for classifying a priority order of each of the plurality of data transmission events, and the upstream host manages the order of the plurality of data transmission events according to the arbitration table.

7. The method as claimed in claim 6, wherein the plurality of data transmission events are classified into high priority events, middle priority events, and low priority events.

8. The method as claimed in claim 6, wherein the priority order of each of the plurality of data transmission events in the arbitration table gradually becomes higher as a waiting time period thereof increases.

9. The method as claimed in claim 1, further comprising:
    monitoring a plurality of input packages entering the plurality of downstream hosts by the talk controllers of the plurality of downstream hosts to determine whether to transmit any priority instructions to the upstream host.

10. The method as claimed in claim 9, wherein each of the talk controllers of the plurality of downstream hosts stores a transmission table for classifying a priority order of each of the plurality of input packages.

11. The method as claimed in claim 10, wherein the plurality of input packages are classified into high priority input packages, middle priority input packages, and low priority input packages.

12. The method as claimed in claim 1, wherein the upstream host is coupled through an Ethernet to the plurality of downstream hosts.

13. The method as claimed in claim 1, wherein the upstream host and the plurality of downstream hosts use an Openflow network structure.

14. The method as claimed in claim 1, wherein the upstream host and the plurality of downstream hosts are virtual machines.

15. The method as claimed in claim 1, wherein the upstream host and the plurality of downstream hosts are physical machines.

16. A non-transitory computer-readable medium encoded with computer-executable instructions that, when executed, cause an electronic apparatus to perform a method for managing a transmission order in a network comprising an upstream host and a plurality of downstream hosts, the method comprising:
    managing, by the upstream host, an execution order of a plurality of data transmission events between the upstream host and the plurality of the downstream hosts;
    performing, by the upstream host, a first data transmission event in the execution order to receive first data from a first downstream host;
    monitoring, by the upstream host, whether the upstream host receives any priority instructions from any other downstream hosts; and if a first priority instruction is received from a second downstream host during the first data transmission event, stopping the first data transmission event and performing a second data transmission event by the upstream host to receive second data from the second downstream host;

wherein each of the upstream host and the plurality of downstream hosts comprises a talk controller, and the upstream host further comprises a network switch;

wherein the talk controller of the upstream host stops the first data transmission event by transmitting a stop-talk command via the network switch to the talk controller of the first downstream host, and starts the second data transmission event by transmitting a start-talk command via the network switch to the talk controller of the second downstream host.

* * * * *